Figure 13:
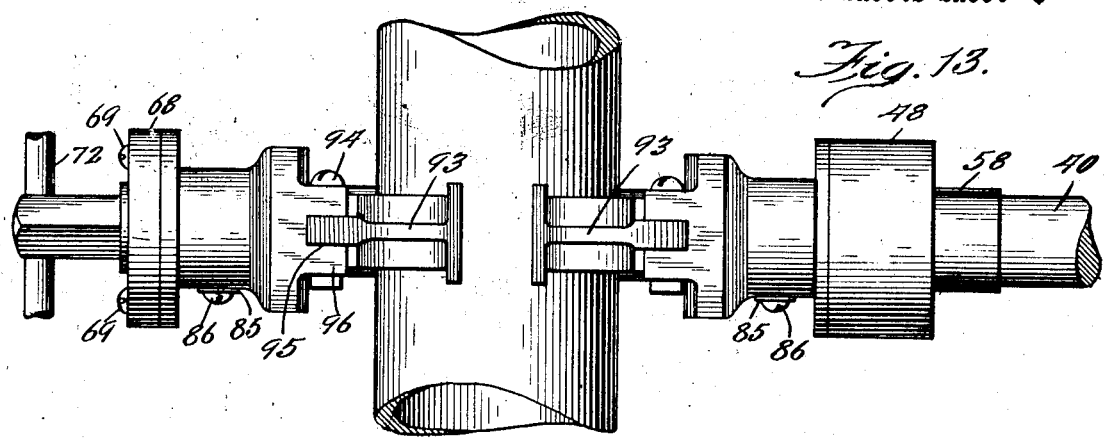

Aug. 11, 1931.  E. A. ODIN  1,818,501
UNIVERSAL VISE
Filed July 9, 1927  7 Sheets-Sheet 1
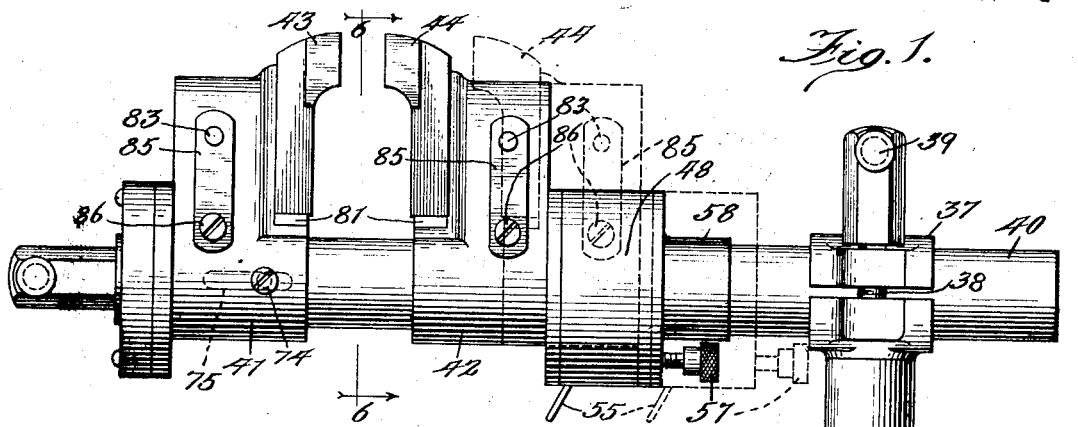
Fig. 1.
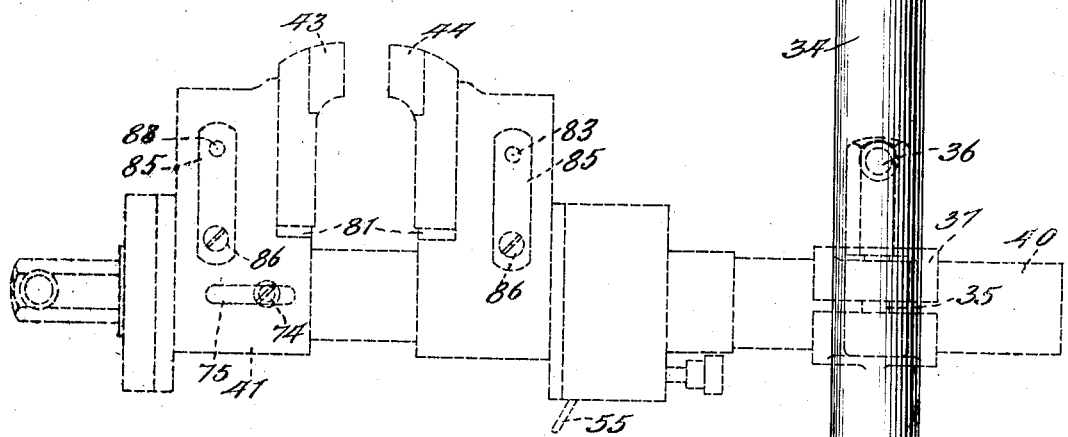
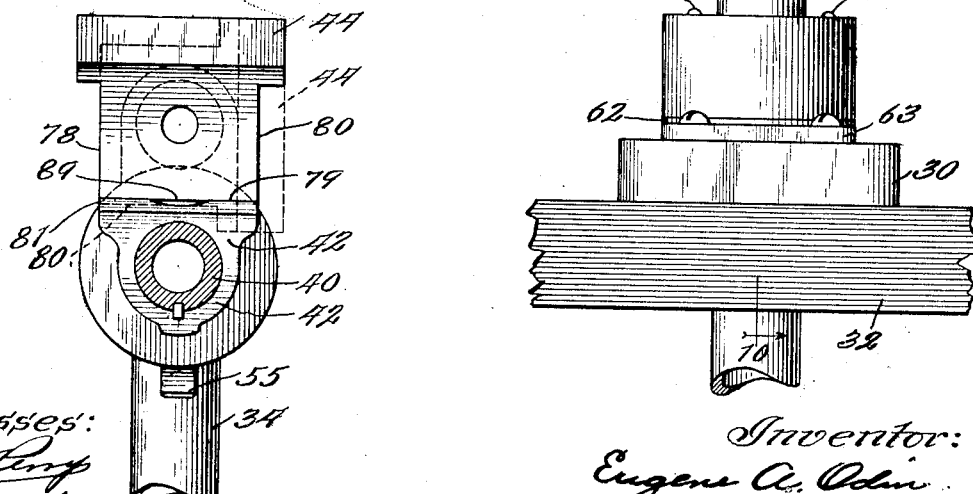
Fig. 6.
Witnesses:
Inventor:
Eugene A. Odin
By John Howard McElroy
his Atty.

Aug. 11, 1931.  E. A. ODIN  1,818,501
UNIVERSAL VISE
Filed July 9, 1927  7 Sheets-Sheet 2
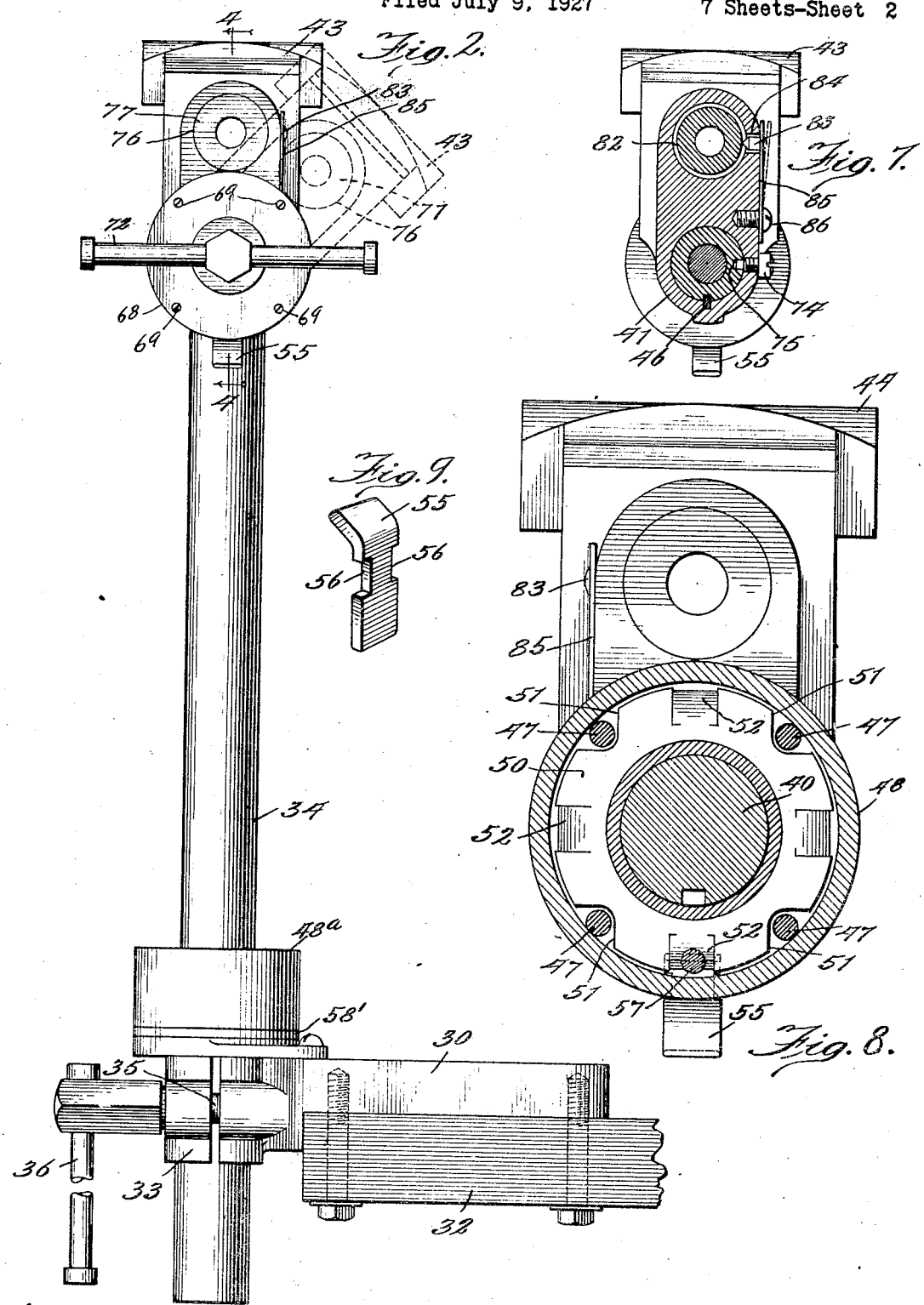
Inventor:
Eugene A. Odin
By John Howard McElroy
his Atty.
Witnesses:
Harry H. Hitzeman

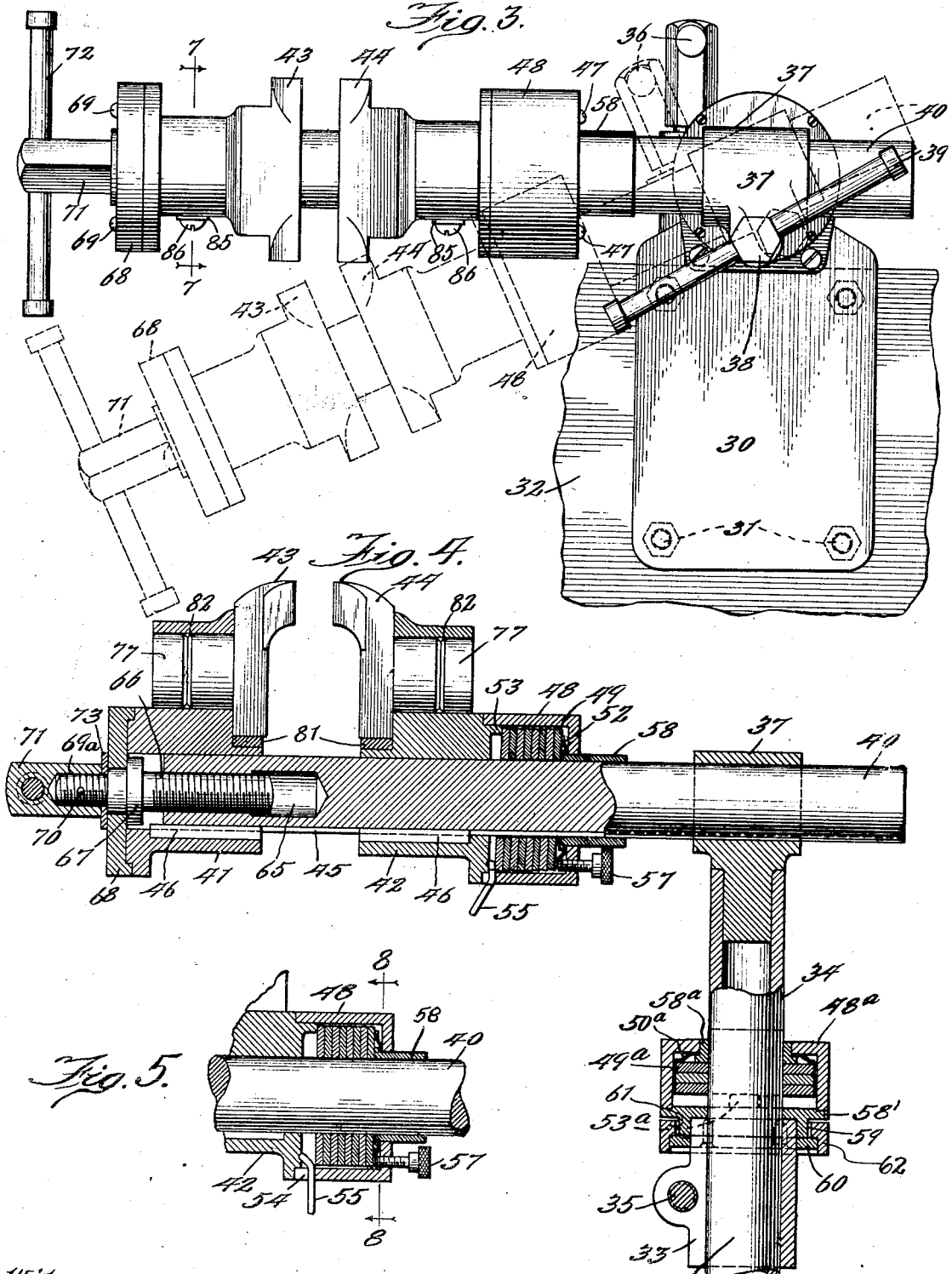

Aug. 11, 1931.   E. A. ODIN   1,818,501
UNIVERSAL VISE
Filed July 9, 1927   7 Sheets-Sheet 4
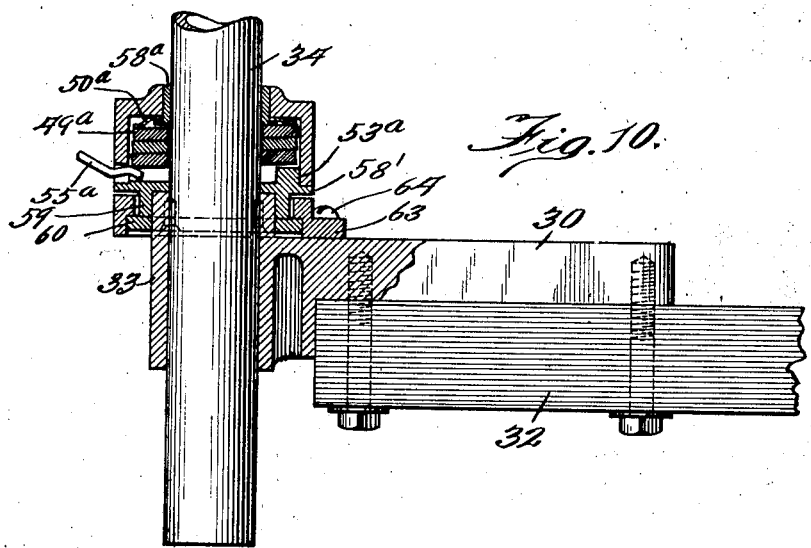
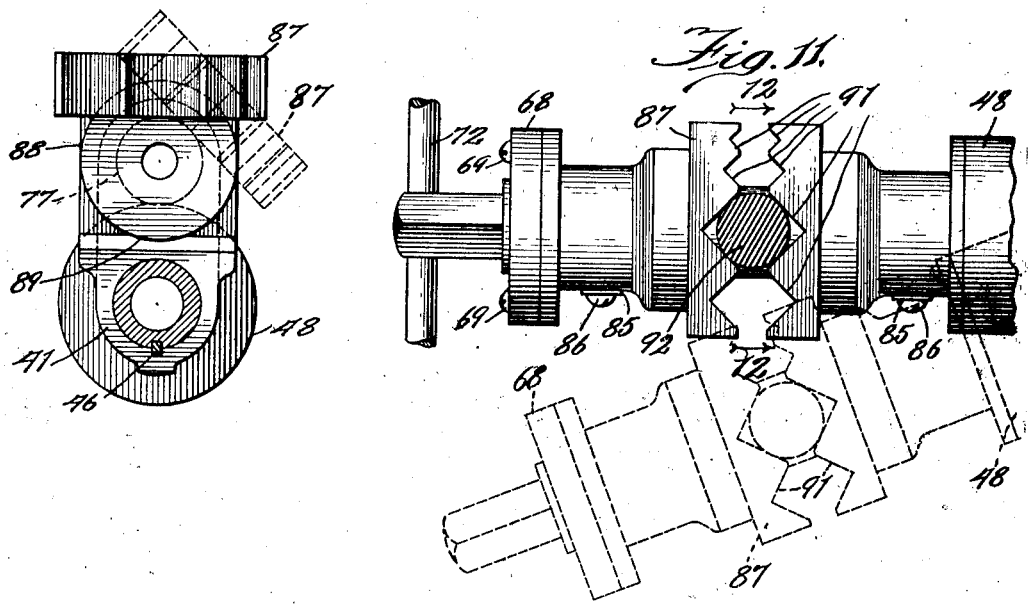

Aug. 11, 1931.  E. A. ODIN  1,818,501
UNIVERSAL VISE
Filed July 9, 1927  7 Sheets-Sheet 5

Witnesses:

Inventor:
Eugene A. Odin
By John Howard McElroy
his Atty.

Aug. 11, 1931.  E. A. ODIN  1,818,501
UNIVERSAL VISE
Filed July 9, 1927   7 Sheets-Sheet 6

Witnesses:
Ira E. Perry
Harry H. Hitzeman

Inventor:
Eugene A. Odin
By John Howard McElroy
his Atty.

Aug. 11, 1931.  E. A. ODIN  1,818,501
UNIVERSAL VISE
Filed July 9, 1927   7 Sheets-Sheet 7

Witnesses:
Ira D. Perry
Harry N. Hitzman

Inventor:
Eugene A. Odin
By John Howard McElroy
his Atty.

Patented Aug. 11, 1931

1,818,501

UNITED STATES PATENT OFFICE

EUGENE A. ODIN, OF CHICAGO, ILLINOIS

UNIVERSAL VISE

Application filed July 9, 1927. Serial No. 204,564.

My invention is concerned with universal vises, and is designed to produce a vise in which any object (within its capacity and range limits) can be secured so as to bring the body thereof in any desired location and any face of the same into whatever angular position may be necessary in order to work conveniently on said face, such vises being especially useful in garages and other establishments where the various irregular-shaped parts of automobiles, etc., have to be held firmly in various positions.

To this end, it consists primarily of a stationary base piece in which a supporting rod carrying clamping means can be clamped in a vertical or a horizontal position after it has been rotated in the clamping means carried by the base to the angle necessary to bring the secondary supporting rod held in the primary rod clamping means to the proper angle to bring the article to be worked on and held in jaws carried by the secondary rod into the proper position where its angle can finally be determined by rotating and securing the secondary rod in the clamping means supporting it and carried by the primary rod.

Further to facilitate holding the article to be worked on in the desired position, I may provide the clamping means carried by the secondary rod with interchangeable jaws of different sizes and shapes, all as will be hereinafter fully illustrated and described.

Finally, to facilitate the operation of the device, I preferably associate with one of the rods, primary or secondary as the case may be, cramping mechanism which permits the free movement of the rod in one direction while preventing its movement in the other, and I preferably employ similar cramping mechanism between the secondary rod and one of the jaws moving thereon, thus facilitating the adjustment of the parts at a speed not possible with vises using only screw-threaded connections between the relatively movable supports.

To illustrate my invention, I annex hereto seven sheets of drawings, in which the same reference characters are used to designate identical parts in all the figures, of which,—

Figure 14:
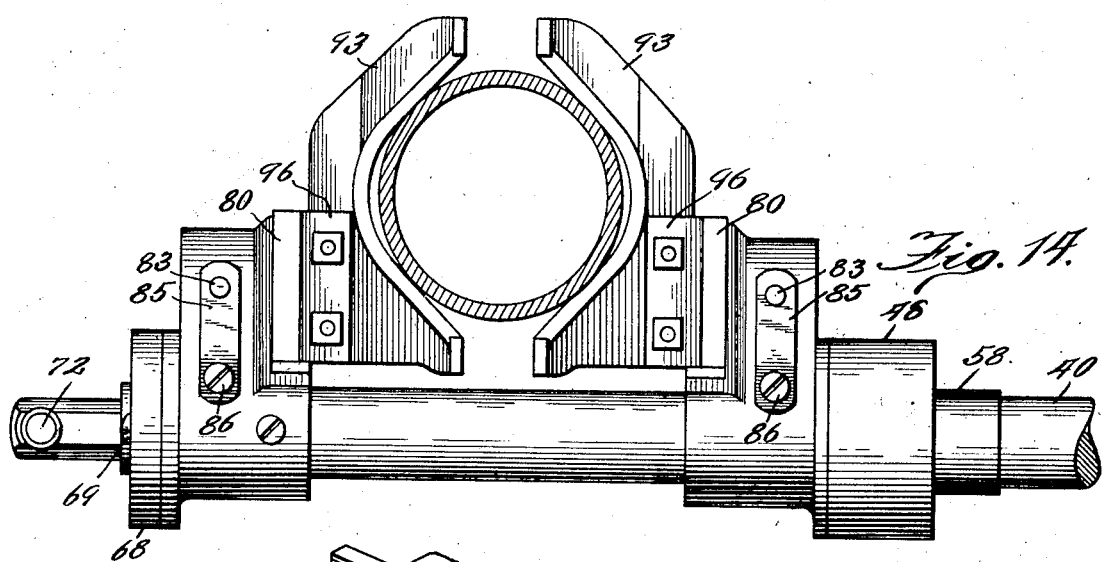
Figure 15:
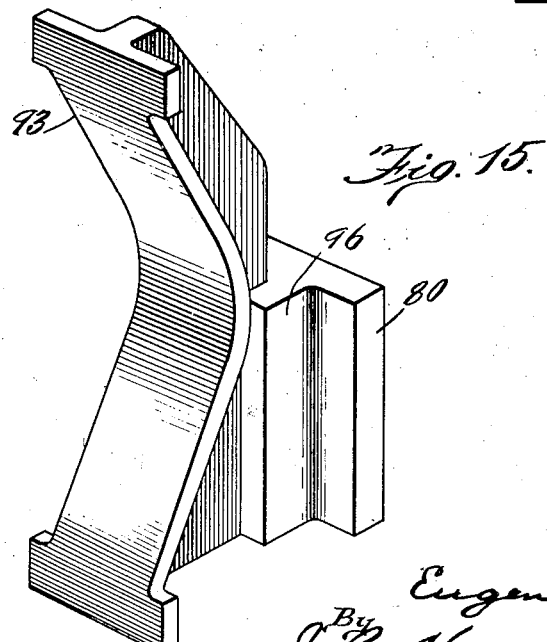
Figure 16:
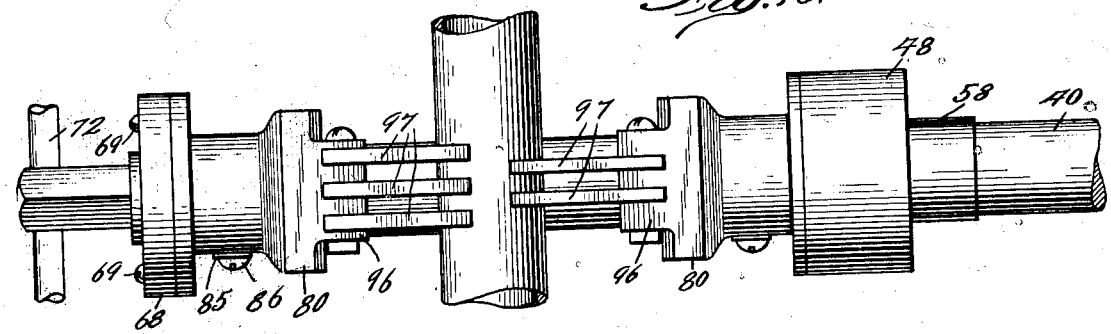
Figure 17:
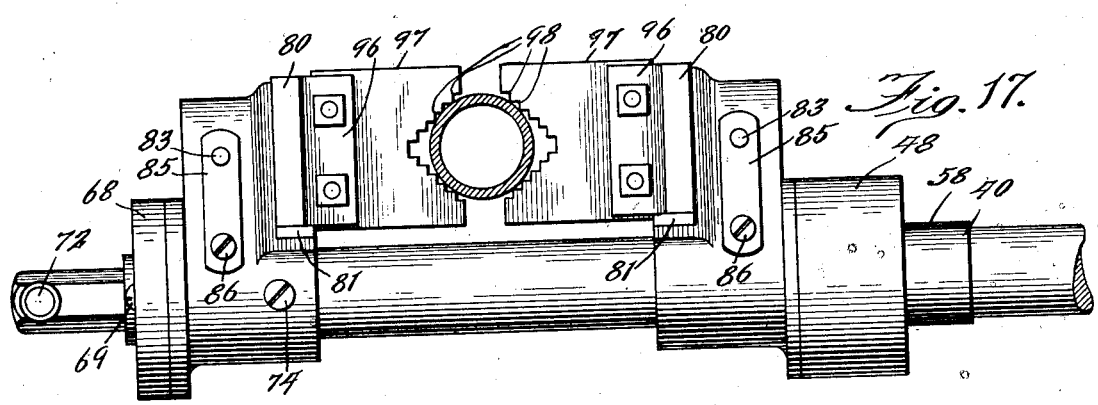
Figure 18:
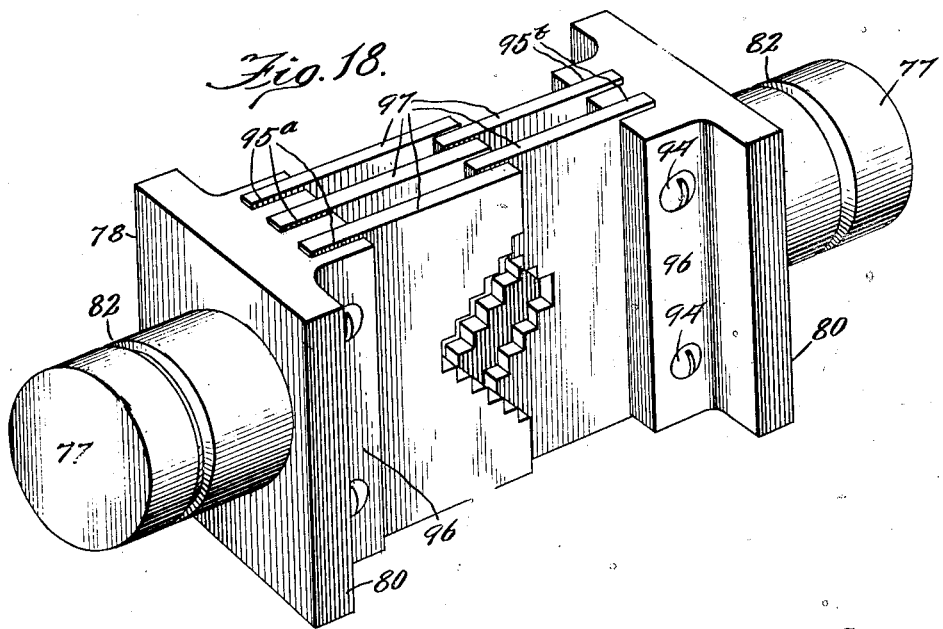
Figure 19:
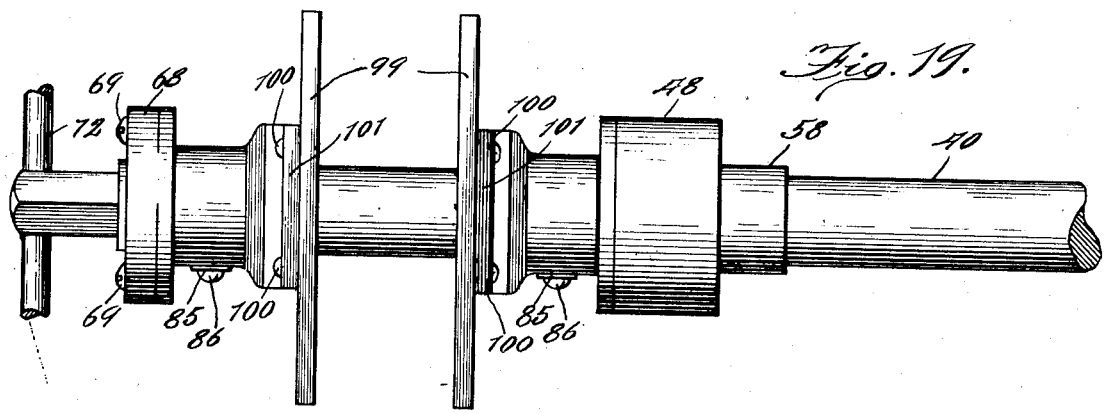
Figure 20:
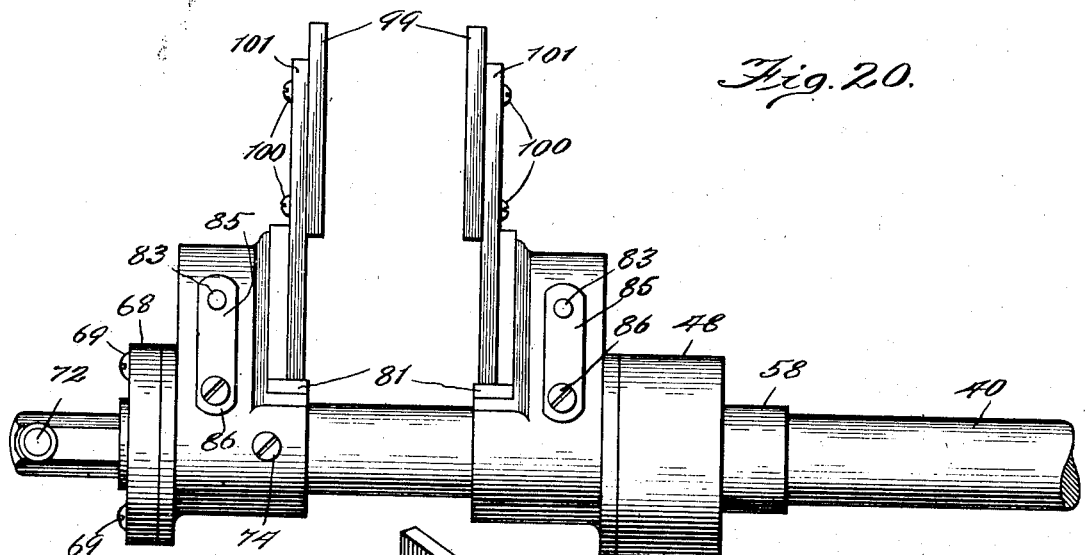
Figure 21:
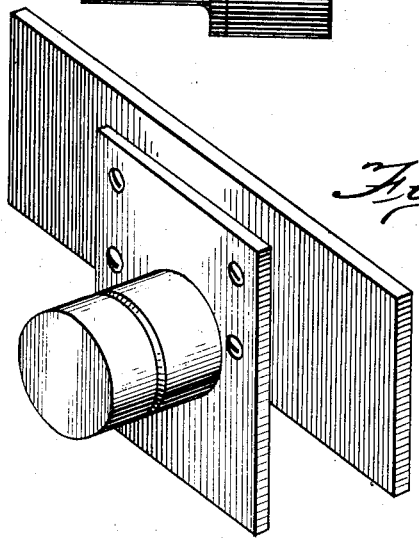

Fig. 1 is a side elevation of a vise embodying my invention;
Fig. 2 is an end elevation of the same;
Fig. 3 is a top plan view;
Fig. 4 is a vertical section on the line 4—4 of Fig. 2;
Fig. 5 is a detail showing part of the mechanism of Fig. 4, with the cramping disks moved to releasing position;
Fig. 6 (Sheet 1) is a view in cross section on the line 6—6 of Fig. 1;
Fig. 7 (Sheet 2) is a detail in section on the line 7—7 of Fig. 3;
Fig. 8 is a detail in section on the line 8—8 of Fig. 5, but on a larger scale;
Fig. 9 is a detached, perspective view of the releasing trigger on the scale shown in Fig. 8;
Fig. 10 is a detail in section on the line 10—10 of Fig. 1;
Fig. 11 is a top plan view of a novel pair of jaws;
Fig. 12 is a view in section on the line 12—12 of Fig. 11;
Fig. 13 is a top plan view of another form of special jaw;
Fig. 14 is a side elevation of the same;
Fig. 15 is a perspective view, on an enlarged scale, of one of the jaws shown in Figs. 13 and 14, detached;
Figs. 16, 17 and 18 are views similar to Figs. 13 to 15, but showing still another form of special jaw; and
Figs. 19, 20 and 21 are views similar to Figs. 16 to 18, showing still another form of special jaw.

In carrying out my invention in its preferred form, I employ a comparatively heavy metallic base piece 30, which will be secured by bolts 31 or otherwise to the customary work-bench 32. At the outer end of the base 30, I employ a pair of split-ring clamping jaws 33 adapted to receive and clamp the primary supporting rod 34, the customary screw rod 35 and handle 36 being employed to clamp and unclamp the jaws 33 on the rod 34. This rod 34, as seen in Fig. 4, is preferably hollow, and has secured in its upper end clamping means consisting of the split-ring jaws 37, opened and closed by the customary screw 38 and sliding handle-rod 39. Mounted to slide horizontally in the clamping jaws 37 is the secondary supporting rod 40, which is provided with a pair of clamping members 41 and 42 splined on the rod 40 and provided with the preferably removable jaws 43 and 44, which may be of any design necessary for the particular work to be accomplished. Each of these jaws relative to the other constitutes an opposing abutment. Suitable means for opening and closing the jaws 43 and 44 by the relative movement of the supports 41 and 42 are provided, the specific mechanism employed being dependent upon the character of the connections between the supporting members 41 and 42 and the secondary supporting rod 40. As seen in Fig. 1, the height of the object to be worked upon can be adjusted by moving the primary supporting rod 34 up and down, and clamping it in the desired position. At the same time, the horizontal position of the object can be regulated, as seen in Fig. 3, by rotating the primary supporting rod 34 in its clamping jaws 33 before the jaw is tightened. The horizontal position of the object is further adjusted by moving the secondary clamping rod 40 in or out of the clamping jaws 37, and the angle at which the article to be worked upon is held is controlled by rotating the secondary supporting rod 40 in the jaws 37, as indicated by the dotted-line position of the vise jaws 43 and 44, shown in dotted-line position in Fig. 2.

By the adjustability of the various elements in the manner hereinbefore set forth, it will be obvious that I can secure any object in any desired position (within the range of the device) and at any desired angle so that the face of the object to be worked on can be brought to the best possible and most convenient position for such work. I, however, preferably employ, in connection with the universal adjustment shown, quick-acting adjustments, to be now described.

Referring more especially to Figs. 4, 5 and 8, it will be seen that the secondary supporting rod 40 has the spline groove 45 therein, and the members 41 and 42 are provided with the splines 46 co-operating therewith. The jaw-supporting member 42 has the cylindrical aperture therein fitting loosely on the rod 40, and it has secured on the outer end thereof, by the screws 47, the cup 48, which contains a plurality of cramping disks 49, which fit just loosely enough on the rod 40 so that they can occupy either the position shown in Fig. 5, at right angles to the rod 40, or the cramping position shown in Fig. 4, where they are tilted slightly and enough to bind on the rod 40. The disks 49 are pressed toward the jaw-holding member 42 by the spring 50, best shown in Fig. 8, which is a spring metal disk with the recesses 51 stamped out to accommodate the screws 47, and with the tongues 52 turned down to give the spring action against the adjacent disk 49. The spring forces the disks toward the jaw-supporting member 42, and at the top of the cup 48 is the lug 53 secured to or formed integrally with the jaw-supporting member 42 and located so as to form an abutment against which the adjacent disk 49 is pressed. Located in a recess 54 formed in the cup 48, an adjacent portion of the jaw-holding member 42 is a trigger 55, formed, as shown in Fig. 9, with the recess 56 therein co-operating with the edges of the recess 54 to hold the trigger in place. Assuming the parts are in the position shown in Fig. 4, if it is desired to move the jaw 44 closer to the jaw 43, all that is necessary is to shove the jaw-holding member 42 in that direction, as the disks 49 do not tend to cramp during such movement, but if movement in the opposite direction be attempted, the disks will immediately cramp, as shown in Fig. 4, and backward movement of the jaw 44 is impossible. I may, under certain conditions, desire to keep the jaw 44 in a certain advanced position and depend for the separation of the jaws entirely upon the movement of the jaw 43, and for that purpose, I employ the set screw 57, which may be screwed in against the adjacent tongue 52 far enough so that it is impossible to straighten the cramping disks 49 and move them to the position shown in Fig. 5, which movement, of course, is effected by operating the trigger 55 as a lever, its inner end engaging the jaw-carrying member 42 as a fulcrum, and its body substantially at the angle engaging the edge of the adjacent disk 49. When the jaw 44 is to be moved back, assuming that the screw 57 is loosened, all that is necessary is to swing the trigger 55 to the position shown in Fig. 5, when the jaw-supporting member will slide back freely on the rod 40. The disks 49 will be made of hardened steel, and I make the aperture therein through which the rod 40 passes larger than the external diameter of the rod and place in the aperture in the cup 48 the sleeve 58, which preferably projects far enough beyond the cup 48 so as to prevent the screw 57 coming in contact with the primary supporting rod 34 and the clamping jaws 37 if the jaw-supporting member 42 should accidentally be moved back as far as possible. If it is purposely moved back until the end of the sleeve 58 engages the clamping jaws 37, the jarring action of any hammering that may be done on the object held in the jaws is transmitted directly through the disks 49 and the sleeve 58 to the rod 34, and no loosening of the cramping action can occur. The inner end of the sleeve 58 is preferably enlarged, forming the shoulder shown, which engages the spring disk 50 and holds it in place. The enlarged inner end of the sleeve 58 also furnishes a substantial vertical abutment to force the disks 49 to, and hold them in, a vertical position when the jaw 42, 44 is being shoved outward to the clamping position. The screws 47 co-operating with the recesses in the periphery of the disks 49 corresponding to the recesses 51 in the spring disk 50 hold the disks 49, as well as the disk 50, from rotation relative to each other, and thus possibly to some extent relieving the cramping action.

For the quick upward movement of the primary supporting rod 34 when the clamping screw 35 has been loosened, and for holding the rod 34 in the desired adjustment until the screw 35 has been tightened, I preferably employ the similar cramping mechanism shown in Figs. 1, 4 and 10, where the cup 48$^a$ has the sleeve 58$^a$ projecting from the end thereof and with its inner end engaging the similar cramping rings 49$^a$, which co-operate with the lug 53$^a$ carried on the collar 58′ to which the cap 49$^a$ is secured by the screws 47$^a$. The spring 50$^a$ is similiar to the spring 50 and operates in the same manner, and the trigger 55$^a$ is similar to the trigger 55 and operates in the same manner. The collar 58′ is provided with an external annular channel 59, conveniently formed by reducing the lower portion of the collar 58′ and securing the annulus 60 thereto when the parts are assembled by screws or otherwise. The channel 59 co-operates with the inwardly projecting annular flange 61 formed on the retaining ring 62 having the extension 63 by which it is secured on the base 30 by the screws 64. With this construction, it will be seen that the cup 48$^a$ and the cramping mechanism contained therein is free to turn on the upper end of the split-ring clamp 33 when the screw 35 is loosened so as to permit the angular adjustment of the rod 34. When the screw 35 is loosened, the rod 34 can also be raised to any desired position, where it will be held by the cramping mechanism alone until the screw 35 is tightened, as it will ordinarily be before the work is begun on the article held in the jaws.

While I might have the jaw-supporting member 41 fixed on the rod 40, I preferably make it adjustable thereon so that the jaw-supporting member 42 need not be shifted except where a very wide opening of the jaws is desired. For this purpose, I form in the outer end of the secondary supporting rod 40 the threaded aperture 65, into which is screwed the bolt 66 having the collar 67 formed thereon and co-operating with the end of the cap 68 secured on the outer end of the jaw-supporting member 41 by the screws 69. The outer end of the bolt 66 is still further reduced and has secured thereon, preferably by the threads 69$^a$ and the pin 70, the support 71 for the sliding handle 72. A washer 73 is clamped against the annular surface formed on the bolt 66 by the reduced outer end, and the space between the inner face of the washer 73 and the adjacent face of the collar 67 is such that the screw bolt 66 turns freely in the cap 68. When the jaws are wide open and a comparatively small article is to be clamped therein, the jaw-supporting member 42 is shoved up to bring the jaw 44 into engagement with the article to be held, and the handle 72 is given a part turn, so much as may be necessary to force the jaw 43 strongly against the article to be clamped, and the thrust thus given is transmitted through the jaw 44 to the cramping disks 49, and insures their being tilted sufficiently so that the jaw-supporting member 42 cannot move backward until the article to be held is released by manipulating the handle 72.

As there would otherwise be a possibility of the bolt 66 being accidentally screwed entirely out, thus unintentionally taking the jaw-supporting member 41 off of the secondary supporting rod 40, I provide, as best seen in Figs. 1 and 7, a screw 74, which is threaded through the wall of the cylindrical portion of the jaw-supporting member 41 and has its reduced and plain inner end extended into a slot 75 formed in the rod 40. This, of course, limits the possible range of movement of the jaw-supporting member 41, and prevents its accidental removal.

The jaw-supporting members 41 and 42 are of substantially the same construction, except for the connections at their outer ends, and as I preferably make the jaws 43 and 44 removable and adjustable, I provide in the upper portion of the members 41 and 42 the cylindrical aperture 76, parallel to the aperture occupied by the rod 40, and of the proper size to receive the cylindrical stems 77 of the jaws 43 and 44. These jaws have the clamping surface proper on one side, and the other three sides 78, 79 and 80 form the three sides of the square, and are adapted to have either one of them engage the co-operating flange 81 formed or secured on the jaw-supporting members. While these flanges may be formed integral with the jaw-supporting members, I preferably form them of strips of hardened steel and secure them to the body of the jaw-supporting member. To hold the jaws yieldingly in position, I form in the stem of each of them the cylindrical groove 82, best seen in Figs. 7 and 18, and to co-operate with this cylindrical groove in any of the three positions in which the jaw may be placed, I employ the pin 83 adapted to stand in the aperture 84 formed in the wall of the jaw-supporting member, and held yieldingly with its inner end in the groove 82 by the leaf spring 85 to which it is riveted, and which leaf spring is held in place by the screw 86. With this construction, with the pin 84 having a tapered end, it will be obvious that when the jaw is to be put in place it is turned to the proper angle and the stem 77 shoved into the aperture 76, where it will be yieldingly held by the co-operation of the pin 83 with the groove 82.

In Figs. 11 and 12, I have shown a special form of jaw 87, which is capable of still wider adjustments, as the jaw portion proper is formed integrally with or rigidly secured to the cylindrical body portion 88, which has the customary stem 77 fitting into the aperture 76, as before. The cylindrical portion 88 is of such diameter that a shallow curved recess 89 has to be formed in the flange 81 to accommodate it. As indicated in dotted lines in Fig. 12, the jaw can be turned to any desired angle whatsoever, and when it is turned to this angle, it is secured by the pressure which is employed in clamping the jaws upon the article held therein. With the form of jaw just described, I preferably employ the plurality of notches 91, of different sizes, as seen in Fig. 11, which enables the operator to firmly grip with this jaw any size of rod 92 that has to be worked upon.

In Figs. 13 to 15, I have shown a special jaw 93, which is adapted to be employed with tubes or shafts, or any circular object having a finished surface which must not be marred, and the shape of the jaw is readily apparent from the figure. The jaw proper is held by the screws 94 in the slot 95 cut in the rectangular projection 96 formed on the body of the intermediate support for the jaw proper, which, as before, is provided with the stem 77 and the surfaces 78, 79 and 80, so that the jaws can be set at any of the three angles desired, in addition to the adjustment provided by rotating the secondary supporting rod 40 in the clamping jaws 37.

In Figs. 16, 17 and 18, I show another special form of jaws, which I may term alligator jaws, and in which the jaws proper consist of the five intermeshing pieces 97 adapted to be secured in the three channels 95ᵃ cut in one of the rectangular projections 96, while two of them are secured in the pair of channels 95ᵇ cut in the other projection 96, the jaws being secured in place, as before, by the screws and bolts 94. The working surfaces of these jaws are provided with the notched recesses 98, and it will be readily apparent that, with the construction shown, a pipe or rod of any size within the capacity of the jaws can be quickly and readily clamped in place. Of course, these jaws are used on pipes and rods where a slight marring of the surface is immaterial. These jaws are likewise provided with the surfaces 78, 79 and 80 co-operating with the flanges 81, as before.

Finally, in Figs. 19 and 21, I show another special form of jaw, similar to those shown in Figs. 13 to 18, except that the jaw proper 99 consists of the wide plates secured by the screws 100 on the narrower vertical plates 101, the lower ends of which contain the stems 77 and have the three surfaces 78, 79 and 80 to co-operate with the flange 81, as before. These jaws are used in clamping boards and other similar objects.

From the foregoing, it will be obvious that my improved vise is capable of use to hold almost any form of object with any face thereof in any desired position and location within the range of the vise, which range may also be increased by having the primary supporting rod 34 held inverted in the clamping jaws 33 with the secondary supporting rod 40 and the jaws carried thereby below the level of the bench 32. Moreover, if more convenient, the primary supporting rod 34 may be left out and the secondary rod 40 substituted in the clamping jaws 33, although this, of course, limits the horizontal range, and to some extent the position of the vise jaws 43 and 44.

While I have herein shown and described novel clamping mechanism between the supporting rod and the co-operating jaw or support, I do not herein claim the same, but reserve the subject matter thereof for a divisional application.

While I have shown and described my invention as embodied in the form which I at present consider best adapted to carry out its purposes, it will be understood that it is capable of modifications, and that I do not desire to be limited in the interpretation of the following claims except as may be necessitated by the state of the prior art.

What I claim as new, and desire to secure by Letters Patent of the United States, is:

1. In a vise, the combination with a supporting rod, of a clamping-jaw support carried thereby and having a cylindrical bore therethrough and a supporting flange below the bore, a clamping jaw having a cylindrical stem adapted to fit in the bore and a plurality of faces in definite angular relation to each other adapted to co-operate one at a time with the flange on the clamping-jaw support, an abutment carried by the supporting rod and opposing the clamping jaw, and means for moving the clamping-jaw support and abutment relatively to each other.

2. In a vise, the combination with a supporting rod, of a pair of opposed clamping-jaw supports carried thereby, each having a cylindrical bore therethrough and a supporting flange below the bore, a pair of co-operating clamping jaws, each having a cylindrical stem adapted to fit in the bore of its associated clamping-jaw support and a plurality of faces in definite angular relation to each other adapted to co-operate one at a time with the flange on the associated clamping-jaw support, and means for moving said clamping-jaw supports relatively to each other along the supporting rod.

3. In a vise, the combination with a supporting rod, of a clamping-jaw support carried thereby and having a cylindrical bore therethrough and a supporting flange below the bore, a clamping jaw having a cylindrical stem adapted to fit in the bore and a plurality of faces in definite angular relation to each other adapted to co-operate one at a time with the flange on the clamping-jaw support, detent means between the clamping-jaw support and the clamping jaw to hold the latter yieldingly in place in the clamping-jaw support, an abutment carried by the supporting rod and opposing the clamping jaw, and means for moving the clamping-jaw support and abutment relatively to each other.

4. In a vise, the combination with a supporting rod, of a clamping-jaw support carried thereby and having a cylindrical bore therethrough and a supporting flange below the bore, a clamping jaw having a cylindrical stem adapted to fit in the bore and a plurality of faces in definite angular relation to each other adapted to co-operate one at a time with the flange on the clamping-jaw support, detent means between the clamping-jaw support and the clamping jaw consisting of an annular groove formed in the stem and a spring-pressed pin carried by the clamping-jaw support and having one end projecting into said groove when the parts are assembled, an abutment carried by the supporting rod and opposing the clamping jaw, and means for moving the clamping-jaw support and abutment relatively to each other.

5. In a vise, the combination with a supporting rod, of a pair of clamping-jaw supports carried thereby, each having a cylindrical bore therethrough and a supporting flange below the bore, a pair of clamping-jaw holders each having a cylindrical stem adapted to fit in the bore and a plurality of faces in definite angular relation to each other adapted to co-operate one at a time with the flange on their respective clamping-jaw supports and having transverse slots across the adjacent faces, jaws adapted to be secured in said slots, and means for moving the clamping-jaw supports relatively to each other along the supporting rod.

6. In a vise, the combination with a supporting rod, of clamping jaw supports carried thereby and having cylindrical bores therethrough and a supporting flange below the bore, clamping jaws having cylindrical stems adapted to fit in the bores, and a plurality of faces in definite angular relation to each other adapted to co-operate one at a time with the flanges on the clamping jaw supports, and means for moving said clamping jaw supports toward and from each other.

7. In a vise, the combination with a supporting rod, of clamping jaw supports carried by said supporting rod, clamping jaws capable of being placed in said supports in different angular positions relative thereto, in which positions they are retained by the configuration of the contacting surfaces of the jaws and supports, means for moving said clamping jaw supports to and from each other on said supporting rod, and detent means between the clamping jaw supports and the clamping jaws to hold the latter yieldingly in place in the clamping jaw supports.

8. In a vise, the combination with a supporting rod, of clamping jaw supports carried by said supporting rod and having cylindrical bores therethrough and a supporting flange below the bore, clamping jaws having cylindrical stems adapted to fit in the bores and a plurality of faces in definite angular relation to each other adapted to co-operate one at a time with the flanges on the clamping jaw supports, means for moving said clamping jaw supports toward and from each other, and detent means between the clamping jaw supports and the clamping jaws consisting of an annular groove formed in said stems and spring-pressed pins carried by the clamping jaw supports and having one end projecting into said grooves when the parts are assembled.

9. In a vise, the combination with a supporting rod, of a clamping jaw support carried thereby, a clamping jaw capable of being placed in said support in different angular positions relative thereto, in which positions it is retained by the configuration of the contacting surfaces of the jaw and support, an abutment carried by the supporting rod and opposing the clamping jaw, and means for moving the clamping jaw support and the abutment relatively to each other.

In witness whereof, I have hereunto set my hand this 28th day of June, 1927.

EUGENE A. ODIN.